(12) United States Patent
Carlson et al.

(10) Patent No.: US 8,644,321 B2
(45) Date of Patent: Feb. 4, 2014

(54) SCHEDULING PACKET TRANSMISSIONS

(75) Inventors: Neil Charles Carlson, San Diego, CA (US); Rajesh K. Pankaj, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1902 days.

(21) Appl. No.: 10/942,214

(22) Filed: Sep. 15, 2004

(65) Prior Publication Data

US 2005/0058137 A1   Mar. 17, 2005

Related U.S. Application Data

(60) Provisional application No. 60/503,550, filed on Sep. 16, 2003.

(51) Int. Cl.
*H04L 12/28* (2006.01)

(52) U.S. Cl.
USPC ............ 370/395.42; 370/395.4; 370/395.43

(58) Field of Classification Search
None
See application file for complete search history.

(56) References Cited

U.S. PATENT DOCUMENTS

| | | | |
|---|---|---|---|
| 5,390,184 A | 2/1995 | Morris | |
| 6,041,359 A * | 3/2000 | Birdwell | 709/238 |
| 6,195,699 B1 * | 2/2001 | Dennis | 709/229 |
| 6,570,073 B2 | 5/2003 | Schultze | |
| 6,570,873 B1 * | 5/2003 | Isoyama et al. | 370/375 |
| 6,850,966 B2 * | 2/2005 | Matsuura et al. | 709/203 |
| 6,862,622 B2 * | 3/2005 | Jorgensen | 709/226 |
| 6,888,830 B1 * | 5/2005 | Snyder, II et al. | 370/392 |
| 6,920,156 B1 * | 7/2005 | Manchester et al. | 370/522 |
| 7,009,996 B1 * | 3/2006 | Eddy et al. | 370/463 |
| 7,085,847 B2 * | 8/2006 | Darnell et al. | 709/232 |
| 7,142,527 B2 * | 11/2006 | Garcia-Luna-Aceves | 370/336 |
| 7,151,745 B2 * | 12/2006 | Lin et al. | 370/230 |
| 7,224,681 B2 * | 5/2007 | Kramer et al. | 370/347 |
| 7,245,624 B2 * | 7/2007 | Kramer et al. | 370/395.4 |
| 7,486,693 B2 * | 2/2009 | Walter et al. | 370/437 |
| 7,586,925 B2 * | 9/2009 | Smith et al. | 370/399 |
| 7,756,100 B2 * | 7/2010 | Lin et al. | 370/347 |
| 2002/0167961 A1 | 11/2002 | Haartsen | |
| 2003/0161316 A1 * | 8/2003 | Kramer et al. | 370/395.4 |
| 2005/0053053 A1 * | 3/2005 | Smith et al. | 370/352 |

FOREIGN PATENT DOCUMENTS

| | | |
|---|---|---|
| EP | 0709982 A1 | 5/1996 |
| JP | 2000151703 A | 5/2000 |
| JP | 2003218820 A | 7/2003 |

OTHER PUBLICATIONS

International Search Report—PCT/US2004/030487, International Searching Authority—European Patent Office—Mar. 15, 2005.
Written Opinion—PCT/US2004/030487, International Searching Authority—European Patent Office—Mar. 15, 2005.
International Preliminary Report on Patentability—PCT/US2004/030487, International Preliminary Examining Authority/US—Alexandria, Virginia—Oct. 2, 2007.

(Continued)

*Primary Examiner* — Michael J Moore, Jr.
(74) *Attorney, Agent, or Firm* — Charles E. Eggers

(57) ABSTRACT

This disclosure provides a synchronous packet manager containing a data structure for scheduling future synchronous packet transmissions and arbitrating between synchronous and asynchronous packet transmissions. Slots required for transmitting a synchronous packet are reserved by marking the corresponding entries in a synchronous packet reservation table. Rather than writing packets to many different queues, the application software fills in a single reservation table per BTS sector.

40 Claims, 12 Drawing Sheets

(56) References Cited

OTHER PUBLICATIONS

European Search Report—EP10172050—Search Authority—Munich—Nov. 17, 2010.

Taiwan Search Report—TW093128058—TIPO—Aug. 9, 2011.
Translation of Office Action in Japanese application 2006-527055 corresponding to U.S. Appl. No. 10/942,214, citing JP2000151703, JP2003218820, MAXEMCHUK_pgs_309_318_XP010309360_year_1998 and EP0709982A1.Dated Oct. 5, 2010.

* cited by examiner

SCHEDULING PACKET TRANSMISSIONS

CLAIM OF PRIORITY UNDER 35 U.S.C. §119

The present Application for Patent claims priority to Provisional Application No. 60/503,550, entitled "SCHEDULING SYNCHRONOUS PACKET TRANSMISSIONS ON A 1xEV-DO FORWARD LINK" filed Sep. 16, 2003, and assigned to the assignee hereof and hereby expressly incorporated by reference herein.

BACKGROUND

1. Field

The present invention relates generally to data packet communications and more specifically to scheduling synchronous packet transmissions on a Time-Division Multiplexed (TDM) communications system.

2. Background

Recently there is a demand for a transmission system to handle both unicast and multicast/broadcast transmission. Unicast transmission is directed to one user, whereas multicast/broadcast is directed to multiple users. In a time-division multiplexed scheme, time slots may be scheduled for unicast or multicast/broadcast packet transmissions. Multicast and broadcast packets are typically synchronous. Thus multicast and broadcast packets are transmitted in specific time slots on a periodic basis. These synchronous packets may come from one or more sources, such as synchronous control channels, sub-synchronous control channels, or multicast/broadcast channels. Unicast packets are typically asynchronous and may be transmitted in any available slot. In other words, the synchronous packets typically have less flexible scheduling requirements than unicast packets.

Packets may take multiple time slots to complete transmission, so the unicast scheduler schedules a unicast packet to complete transmission before the next synchronous packet is sent. When scheduling an asynchronous/unicast packet, the scheduler must be aware of future synchronous packet transmissions. When scheduling a unicast packet, the scheduler looks ahead, for example, the scheduler may consider as many as 64 slots, for synchronous packets that would be due to transmit within that time. In many cases, synchronous packets are not available sufficiently in advance to allow the scheduler to plan; but the unicast scheduler must still leave the appropriate slots open for synchronous packets. There is a need, therefore, to provide a simple, generic mechanism for handling synchronous and asynchronous packet transmissions in one system.

SUMMARY

The embodiments disclosed herein address the above stated needs by providing a synchronous packet manager that contains a data structure for scheduling future synchronous packet transmissions. Slots required for transmitting a synchronous packet can be reserved by marking the corresponding entries in a synchronous packet reservation table. Rather than writing packets to many different queues, the network device fills in a single reservation table per Base Station Transceiver Sub-system (BTS) sector.

Each entry in the reservation table may be assigned a priority, and the synchronous packet manager ensures that a lower priority packet will not preempt or overwrite a higher priority packet.

Finally, the synchronous packet manager provides a mechanism to automatically reserve slots in the reservation table on a periodic basis. This mechanism inserts placeholder reservations into the reservation tables. Each placeholder reservation has a priority to ensure the slots won't get filled by a lower priority packet.

BRIEF DESCRIPTION OF THE DRAWINGS

The features, objects, and advantages of the presently disclosed method and apparatus will become more apparent from the detailed description set forth below when taken in conjunction with the drawings.

DETAILED DESCRIPTION

The following discussion provides one or more embodiments serving as examples, instances, and/or for illustration purposes and clarity of understanding. Any embodiment described herein is not necessarily to be construed as preferred or advantageous over other embodiments.

Increasing demand for wireless data transmission and the expansion of services available via wireless communication technology have led to the development of specific data services. One such service is referred to as High Data Rate (HDR). An example of a HDR type system is the one proposed in the "cdma2000 High Rate Packet Data Air Interface Specification" referred to as "the HAI specification" and as "TIA/EIA/IS-856."

Figure 1:
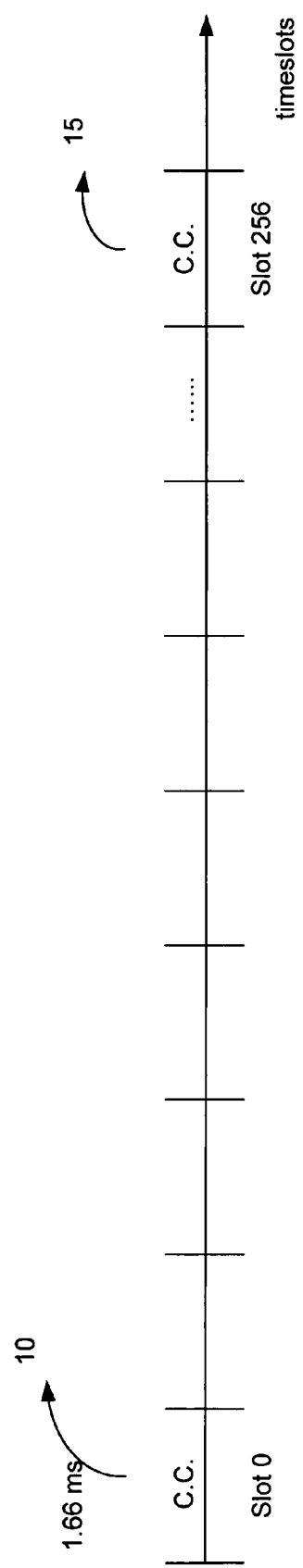
FIG. 1 is a diagram showing timeslots where packet data communications are transmitted on the Forward Link (FL).

In one embodiment, a transmission system supports the standard protocols referred to as 1xEV-DO. As shown in FIG. 1, the 1xEV-DO forward link is time-division multiplexed, consisting of time slots; each of duration 1.66 ms, that may be scheduled for unicast or multicast/broadcast packet transmissions. When packets are sent to a single user, this is called "unicast" and when packets are sent to multiple users, this is called "multicast." Multicast and broadcast packets are typically synchronous, meaning they have to be transmitted in specific time slots, on a periodic basis. These synchronous packets may come from one or more sources, such as synchronous control channels 10 and 15, sub-synchronous control channels, or multicast/broadcast channels. Unicast packets are typically asynchronous and may be transmitted in any available slot. Traffic channels are also considered "unicast." In other words, the synchronous packets from the channels mentioned above typically have less flexible scheduling requirements than unicast packets.

The data on a synchronous Control Channel (CC) is sent in at least one packet every 256 slots, as shown in FIG. 1. This data may consist of information sent to the Mobile Station (MS) such as system parameters. The data on a multicast/broadcast channel is sent periodically and has less flexible scheduling requirements than unicast. This data may consist of streaming video services. Finally, the data on a sub-synchronous control channel, a subdivision of the control channel, is also periodic but has a much smaller period than 256 slots. This data may consist of pages to the MS and may be used when 256 slots is too long a period to wait.

Figure 3:
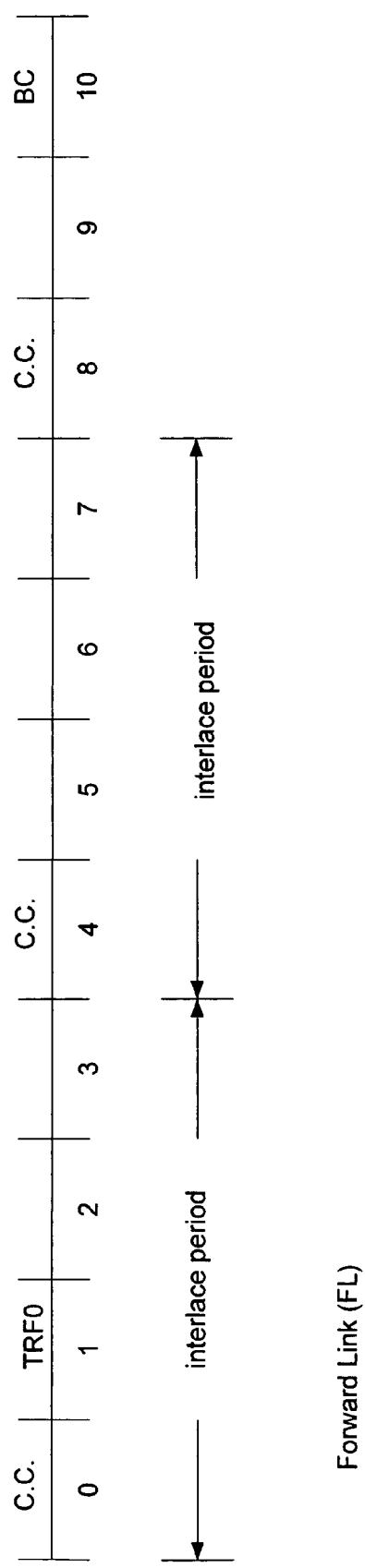
FIG. 3 is a diagram showing timeslots interlaced on the FL.

The basic problem in this system is to keep the synchronous and asynchronous data packets separate. In this particular system, packet transmissions are interlaced over four timeslots. A packet that takes multiple slots to transmit will occupy every fourth slot until it completes transmission, as shown in FIG. 3. For example, the synchronous control channel is sent on timeslots 0 and 4 because the timeslots are interlaced and these data packets are not sent consecutively. Timeslot 1 may be used for sending asynchronous data such as traffic channel data. Interlacing gives the MS time to receive and attempt to decode a multi-slot packet before all slots of the packet have been transmitted. If the MS is able to decode the packet early, then it sends an ACK back to the Base Station (BS) to acknowledge receipt and successful decoding of the data packet.

Figure 2:
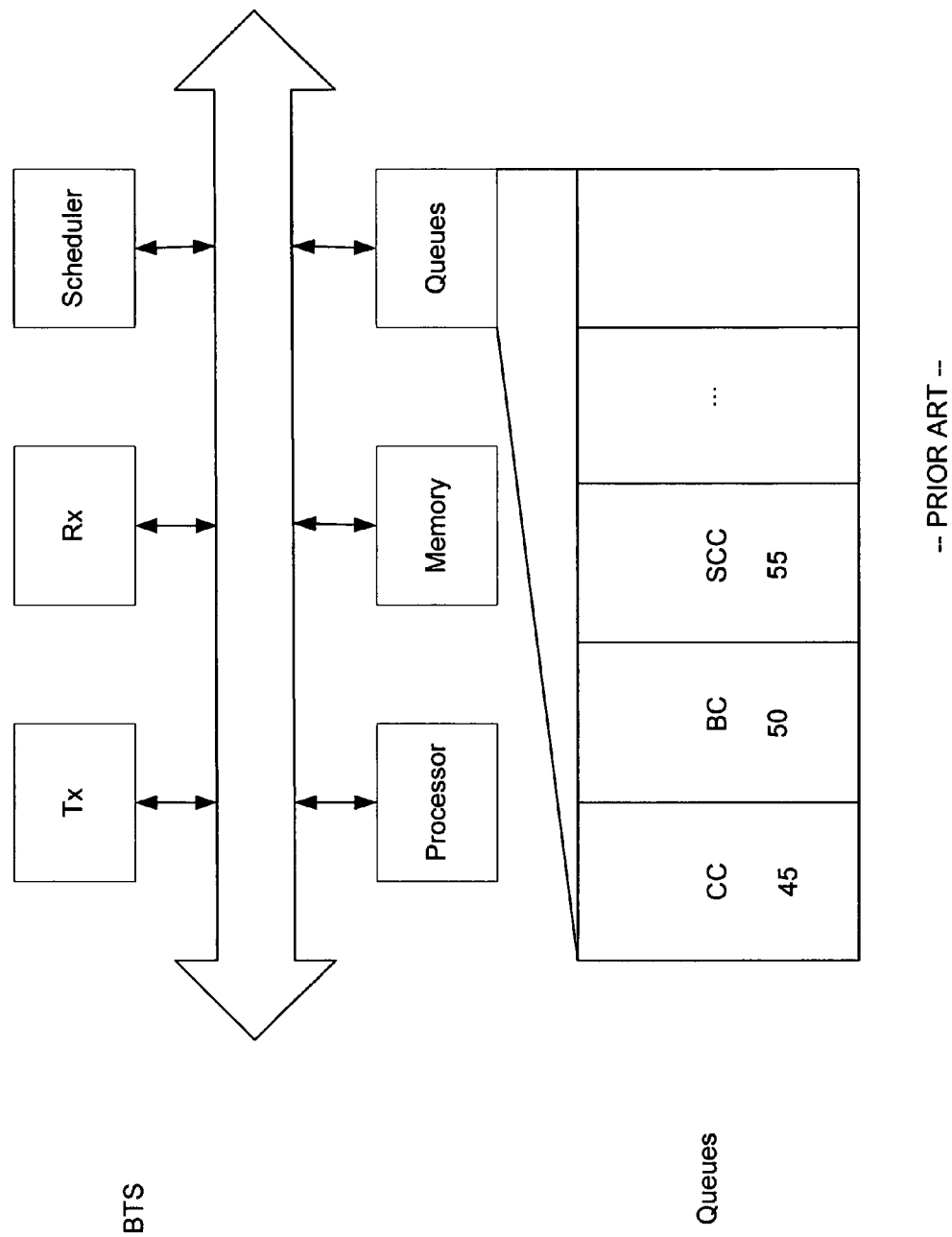
FIG. 2 is a diagram showing queues for the synchronous channels in a communication system.

Others have solved this problem by using a "smart scheduler" as shown in FIG. 2. The smart scheduler knows the timing requirements of different types of synchronous channels. In this example, there are at least three logical channels: Control Channel (CC); Broadcast Channel (BC); and Sub-synchronous Control Channel (SCC). Each logical channel has a queue 45, 50, and 55, etc., in which application software submits to the scheduler the packets that need to be transmitted on the channel. There can be a large number of these queues 45, 50, and 55 (e.g., many broadcast channels). The scheduler looks at the different synchronous packet queues and decides when each packet is to be transmitted. After deciding when the synchronous packets will be transmitted, the scheduler can schedule unicast/asynchronous transmissions to fill the remaining time slots.

In FIG. 3, a control channel packet is sent on timeslots 0, 4, and 8 and a broadcast channel packet is sent on timeslot 10. The traffic channel data, which is a unicast data packet, is sent on timeslot 1 after the control channel and broadcast channel data packets have been assigned and reserved on specific slots. If other unicast data is to be sent on timeslots 2 and 6, for example, the scheduler will look ahead four other timeslots, that is, to make sure that there is no synchronous channel data reserved on timeslot 10. In this case, since timeslot 10 is reserved for broadcast channel data, only timeslots 2 and 6 may be used for unicast channel data. That is, we look ahead four timeslots from timeslot 6. Since timeslot 10 is already for broadcast channel data, unicast reservation stops at timeslot 6. The "smart scheduler" approach is more complicated. It does not have a reservation table, so the way it "looks ahead" is by examining all of its synchronous packet queues to see when the next sync packet is due to transmit. Then it can decide how many slots are available for unicast.

Figure 4:
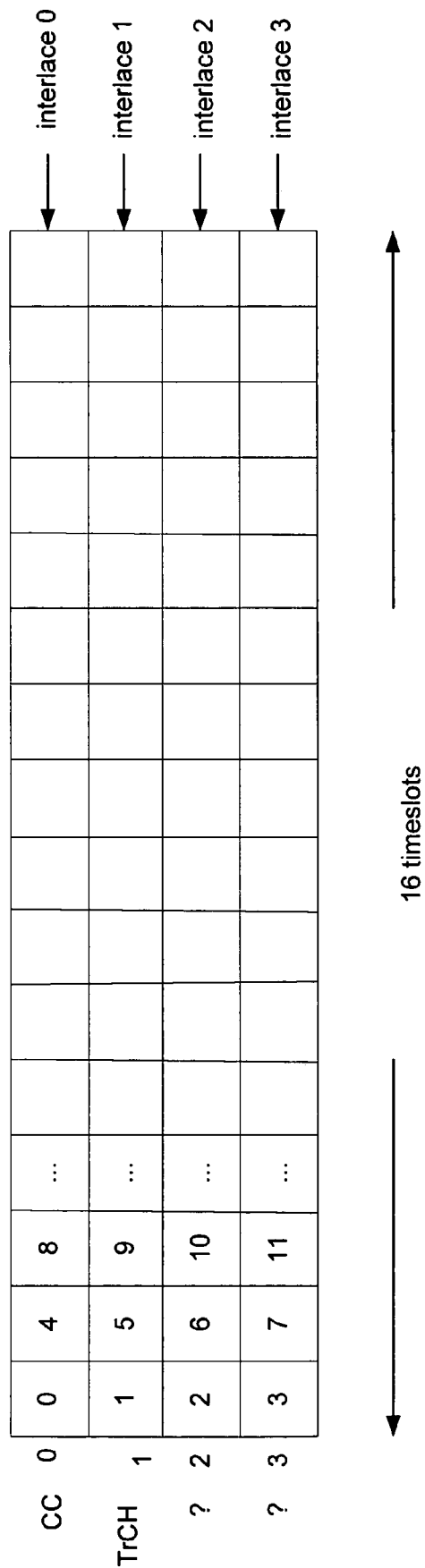
FIG. 4 is a table representing the timeslots where packet data communications are transmitted on the FL.

FIG. 4 is a table representing the timeslots described in FIG. 3. This table is an easier way to represent packets being sent on four interlaces. Each entry in the sync packet reservation table may contain one of the following two types of reservations: a physical layer packet that should begin transmitting in the slot that it occupies; or a placeholder for a physical layer packet that should begin transmitting in the designated slot, provided that the actual packet is submitted to the sync packet manager before the scheduled start time. The first row (row 0) of the table represents the control channel data packets. In row 1, the first slot is reserved for traffic channel data. In row 2, since broadcast channel data is reserved on slot 10, only slots 2 and 6 can be used for unicast channel data. Data packets may take anywhere from 1 to 16 slots. The system looks ahead 16 slots to make sure there is no data scheduled within this range. Low rate packets take many slots to transmit, at most 16 slots*4 interlaces=64 slots. When scheduling a unicast packet, the scheduler has to be able to look ahead as many as 64 slots for synchronous packets that would be due to transmit within that time. In many cases, synchronous packets are not available 64 slots in advance, but the unicast scheduler still leaves the appropriate slots open for synchronous packets. In other words, the scheduler operation is limited so as to avoid over-writing synchronous data packets.

Figure 5:
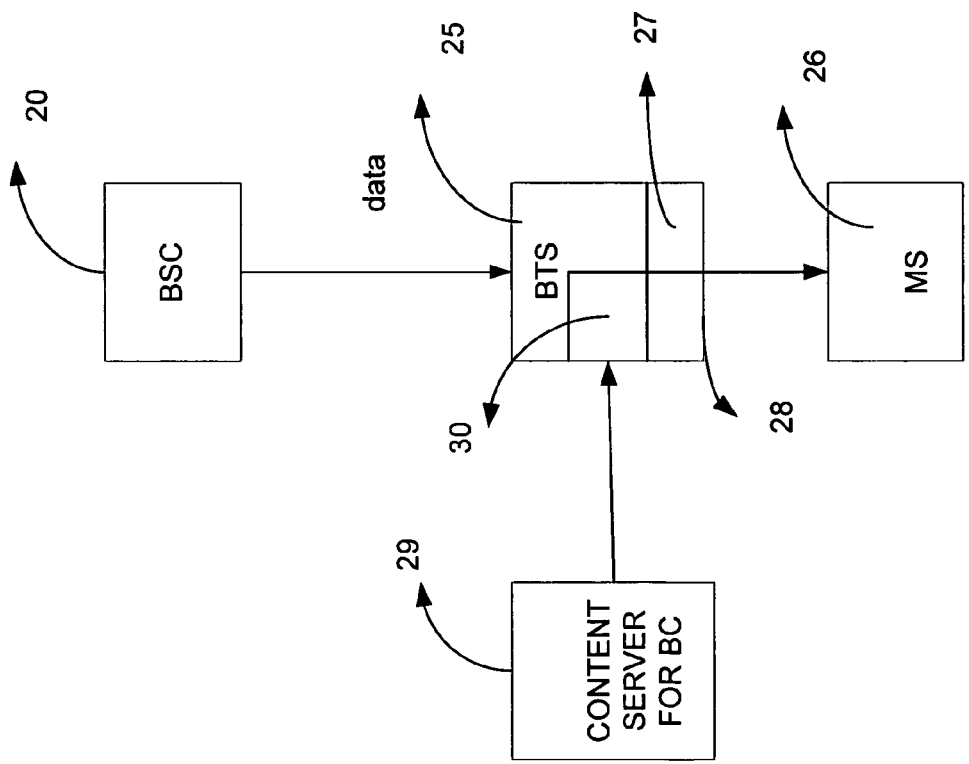
FIG. 5 is a block diagram showing the interaction between the Base Station Controller (BSC) and the Base Station Transceiver Sub-system (BTS).

The scheduling of timeslots is performed in BTS 25 of FIG. 5. As illustrated in this figure, the BSC 20 sends data to the BTS 25. A Content Server (CS) 29 is illustrated as providing data to BTS 25 and may also provide data via BSC 20. A problem occurs when BSC 20 does not send synchronous data; the BTS 25 still reserves a slot for synchronous data packets. The BSC sends the sync data after unicast scheduling decisions have already been made that could potentially conflict with the sync packet. There are two aspects to the problem. First, the scheduler must ensure asynchronous packets do not over-write synchronous packets. Second, even if the BSC 20 has not sent data to the BTS 25, the BTS 25 ensures that slots are reserved for synchronous data packets. In other words, the smart scheduler must know when synchronous packets are due to transmit even if the packet has not yet been written to its queue. The BTS 25 includes a scheduler 27, a synchronous packet manager 28, and a synchronous packet reservation table 30.

The scheduler 27 dedicates memory for these queues and has knowledge of the timing requirements of the broadcast channel. The scheduler 27 will typically examine the head of each queue to determine if the channel has data to send. One problem with this method is complexity. This method requires extra memory to store channel information (e.g., queues). Further this method is not flexible because the scheduler is updated on introduction of each new synchronous channel.

Synchronous Packet Management

Figure 6:
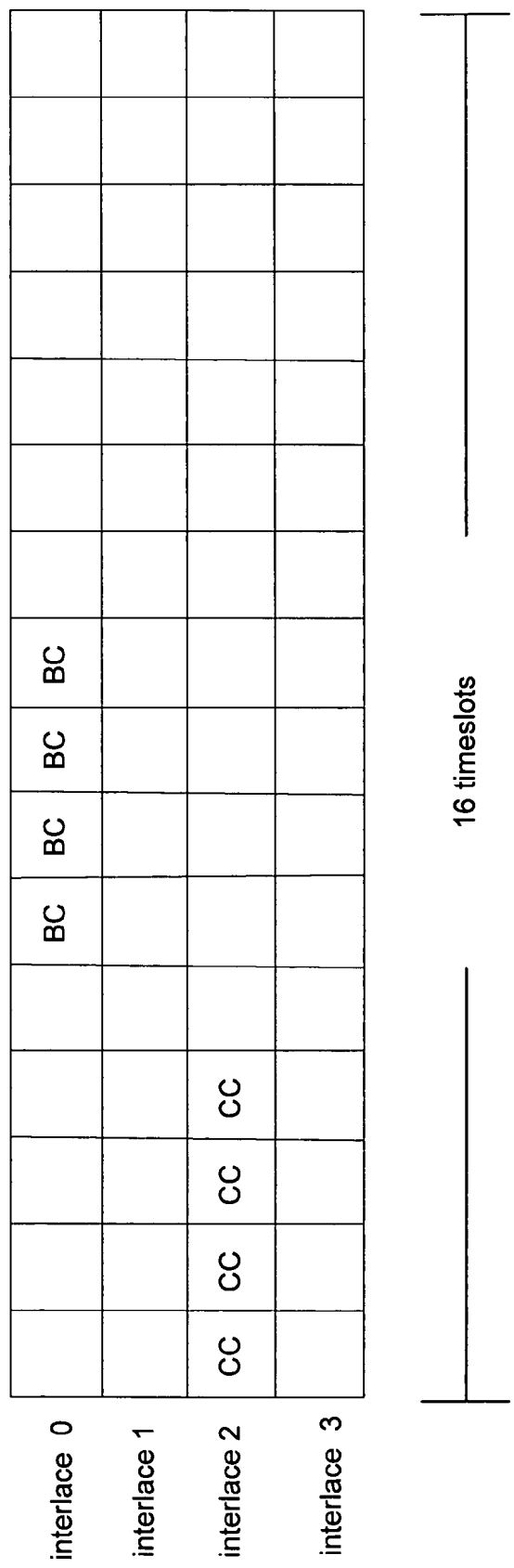
FIG. 6 is a table representing a packet reservation table.

In order to solve the above-mentioned problems, the following reservation table is described. In this regard, the reservation table is a simple and flexible solution because the scheduler 27 may operate without information regarding specific types of channels. As shown in the synchronous packet reservation table 30 as in FIG. 6, the synchronous packet manager 28 simply reports how many of the subsequent slots (if any) are available for asynchronous/unicast packets. For example, the first 5 slots in row 0 can be used for unicast packets. The synchronous packet manager 28 arrives at this slot count by examining the next one or more entries in the reservation table. If a reservation table entry is empty then the slot is made available for unicast.

The placeholder reservations ensure that a multi-slot unicast packet is not scheduled which overlaps the slots required by a future synchronous packet (one that may not have been written into the table yet). The synchronous packet manager 28 has no knowledge of specific synchronous channels, which makes it more flexible and capable of handling a wide range of channel types. Any number of logical channels (e.g., handled by application software) can write to the synchronous packet reservation table 30. The simplicity and flexibility of the synchronous packet manager 28 or scheduler 27 make each a good candidate for hardware implementation.

The synchronous packet manager 28 or scheduler 27 has the following advantages. First, the generic mechanism easily extends to new synchronous channel types without firmware/hardware modification. The synchronous packet manager 28 was originally designed to handle the synchronous control channel and broadcast/multicast channels, but it will easily handle the new sub-synchronous control channel as well. Second, it scales well to large numbers of logical synchronous channels. A logical channel is one instance of a particular type of channel. For example, a three sector BTS could have 48 logical broadcast channels, 3 synchronous control channels, and 3 sub-synchronous control channels. Finally, it is a simple design that could easily be implemented in hardware.

In one embodiment, the FL DSP supports a generic synchronous packet interface that can be used to transmit physical layer packets at specified start times. This interface is suitable for transmitting both synchronous control channel and broadcast channel packets, since in both cases, the host driver at the BTS knows ahead of time exactly when the packets are to be transmitted. In other words, this synchronous packet interface provides a means of bypassing the unicast scheduler and requesting a physical layer packet transmission beginning in a specific time slot.

Sync Packet Reservation Table

Figure 7:
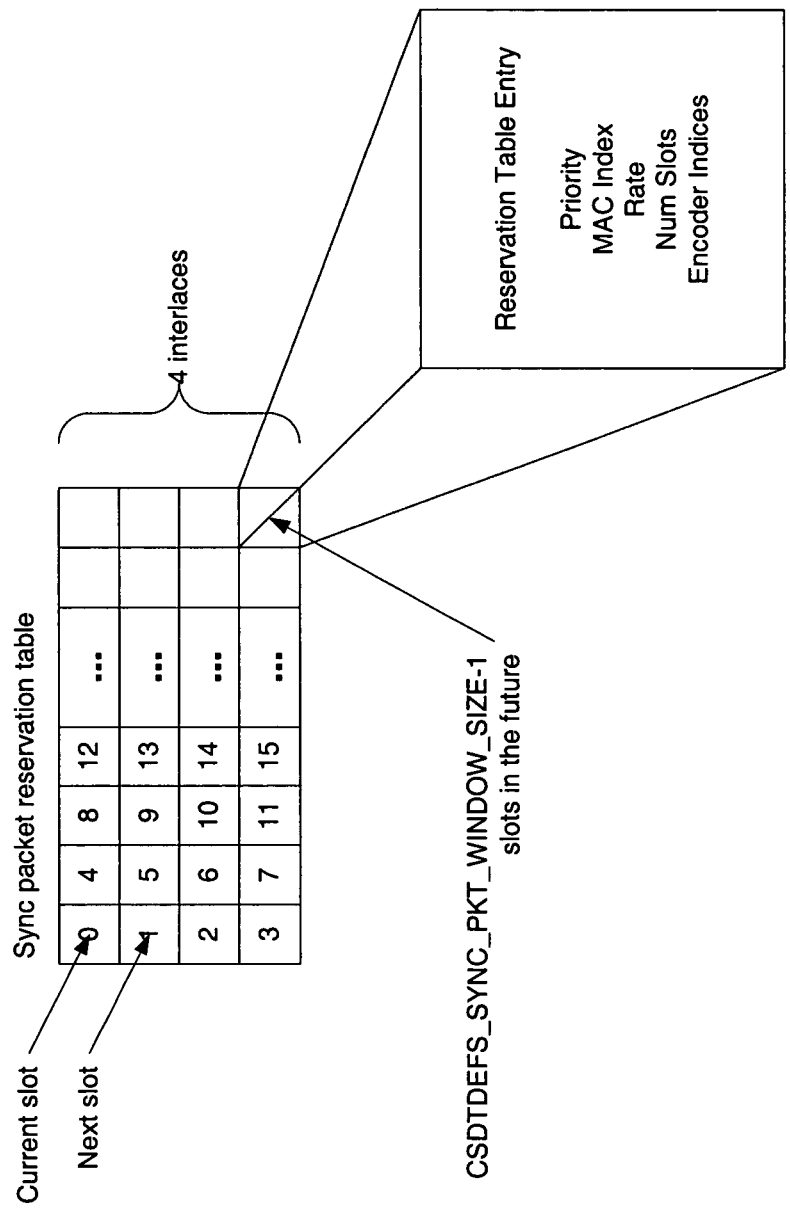
FIG. 7 is a table representing a synchronous packet reservation table.

In one embodiment, the FL DSP maintains a sync packet reservation table for each sector, as shown in FIG. 7. This reservation table is basically a calendar of future sync packet transmissions. The sync packet reservation table contains SYNC_PKT_WINDOW_SIZE entries, where each entry in the table represents one slot. The table may be thought of as a sliding window of reservations, such that table entry 0 always represents the current slot, and table entry SYNC_PKT_WINDOW_SIZE−1 always represents the future-most reservation in the table.

An example of a sync packet reservation table is shown below in FIG. 7. The table is shown containing four rows, which represent the four physical layer interlaces. This layout makes it easier to identify the slots that a multi-slot physical layer packet will occupy. A multi-slot packet that begins transmitting in slot S will also transmit in slots S+4, S+8, etc., which are adjacent in the table shown in FIG. 7.

Each entry in the sync packet reservation table may contain one of the following two types of reservations: a physical layer packet that should begin transmitting in the slot that it occupies; or a placeholder for a physical layer packet that should begin transmitting in the designated slot, provided that the actual packet is submitted to the sync packet manager before the scheduled start time.

Each sync packet reservation table entry contains the following parameters:

Priority (0 to 15)—the priority of this sync packet reservation. The sync packet manager ensures that a lower priority sync packet will not transmit in a slot reserved by a higher priority sync packet (or placeholder). Priority 0 is the lowest (unreserved) and priority 15 is the highest. An unreserved slot will have a priority of 0.

Medium Access Control (MAC) Index (0 to 63)—the MAC index on which the physical layer packet should be transmitted. An unreserved slot or a placeholder reservation will have a MAC index of 0.

Rate (1 to 12)—the rate at which the physical layer packet should be transmitted. The rate values are the same as those specified for Data Rate Control (DRC) rates. Note that physical layer packet rates other than the specific DRC rates may be achieved by adjusting "NumSlots," which is described below. An unreserved slot or a placeholder reservation will have a Rate of 0.

Num Slots (1 to 16)—the number of slots over which the physical layer packet should be transmitted. The number of slots to be less than or equal to the maximum number of slots required for a physical layer packet at the specified rate. An unreserved slot or a placeholder reservation will have NumSlots set to 0.

Encoder Indices—array of MAX_SYNC_PKTS_PER_SLOT encoder indices (e.g., 2) that identify the MAC layer packets in this physical layer packet. If a physical layer packet at the specified rate requires fewer than MAX_SYNC_PKTS_PER_SLOT MAC layer packets, then the sync packet manager ignores the extra values. An unreserved slot or a placeholder reservation will have its encoder indices set to 0.

Note, a multi-slot sync packet will occupy one entry in the sync packet reservation table (i.e., the one that corresponds with its start time). The sync packet manager resolves collisions, or overlapping sync packets, at the time of scheduling, which is approximately one slot before a sync packet's start time.

Periodic Sync Packet Reservations

This section describes how and when the sync packet manager writes the "placeholder" reservations to the sync packet reservation tables.

Figure 8:
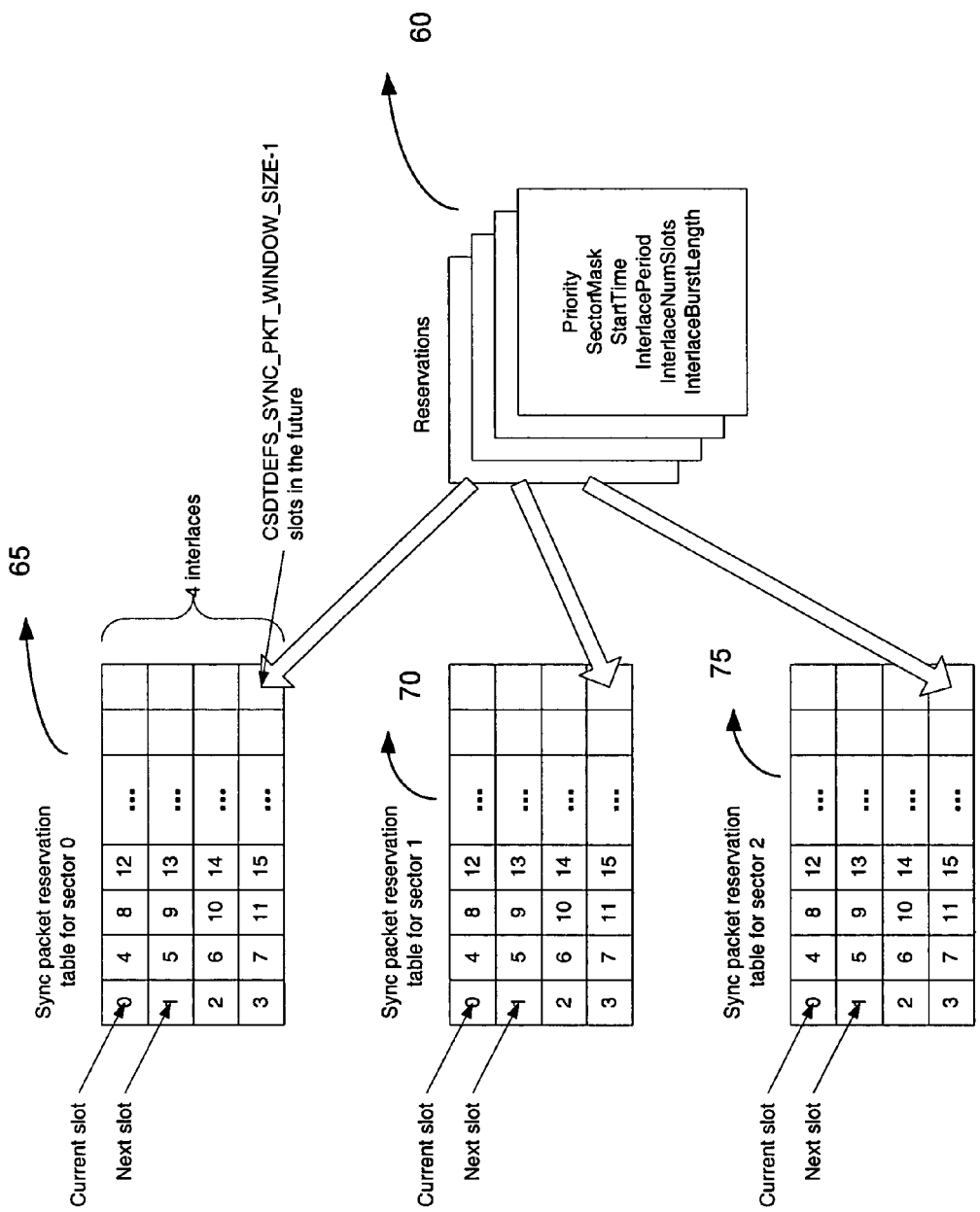
FIG. 8 is a representation of three tables showing periodic synchronous reservation tables being filled simultaneously.

Most synchronous packet transmissions occur on a periodic basis. The synchronous control channel, for example, has a period of 256 slots, or 64 interlace slots on an interlace. Sync packets often aren't available until only a few slots before their scheduled start time, and without any means of reserving the slots for a sync packet transmission, an overlapping multi-slot packet could get scheduled before the sync packet write even occurs. As shown in FIG. 8, the sync packet manager provides the "placeholder" reservations as a way to hold slots open for sync packets that will be written into the reservation tables 65, 70, and 75 at any time within the reservation table window. Reservation tables 65, 70, and 75 are sync packet reservation tables for sectors 0, 1, and 2, respectively.

The sync packet manager maintains a separate list of periodic reservations 60, which trigger the placeholder writes into the sync packet reservation tables. These periodic reservations are updated by the ReserveSyncSlotsCmd and the UnreserveSyncSlotsCmd. Each periodic reservation has the following properties:

Priority—the priority that the placeholder entry will have in the sync packet reservation table(s).

SectorMask—the sector(s) that identify the sync packet reservation table(s) that the placeholders should be written to.

StartTime—the system time that identifies the first slot that should be reserved. The sync packet manager writes all placeholders to the future-most slot of the reservation table(s), so the start time must be at least SYNC_PKT_WINDOW_SIZE slots in the future.

InterlacePeriod—the period of the reservation in units of interlace slots.

InterlaceBurstLength—the duty cycle of the reservation in units of interlace slots (less than or equal to InterlacePeriod).

InterlaceNumSlots—the period (in units of interlace slots) at which the placeholder reservations should be written to the sync packet reservation table(s).

The sync packet manager processes all periodic reservations every slot. FIG. 8 shows the processing of the periodic reservations. Note that all placeholders are written to the future-most entries of the sync packet reservation tables to ensure that the slots won't get allocated to unicast. A single reservation 60 can be sent to multiple tables 65, 70, and 75.

Figure 9:
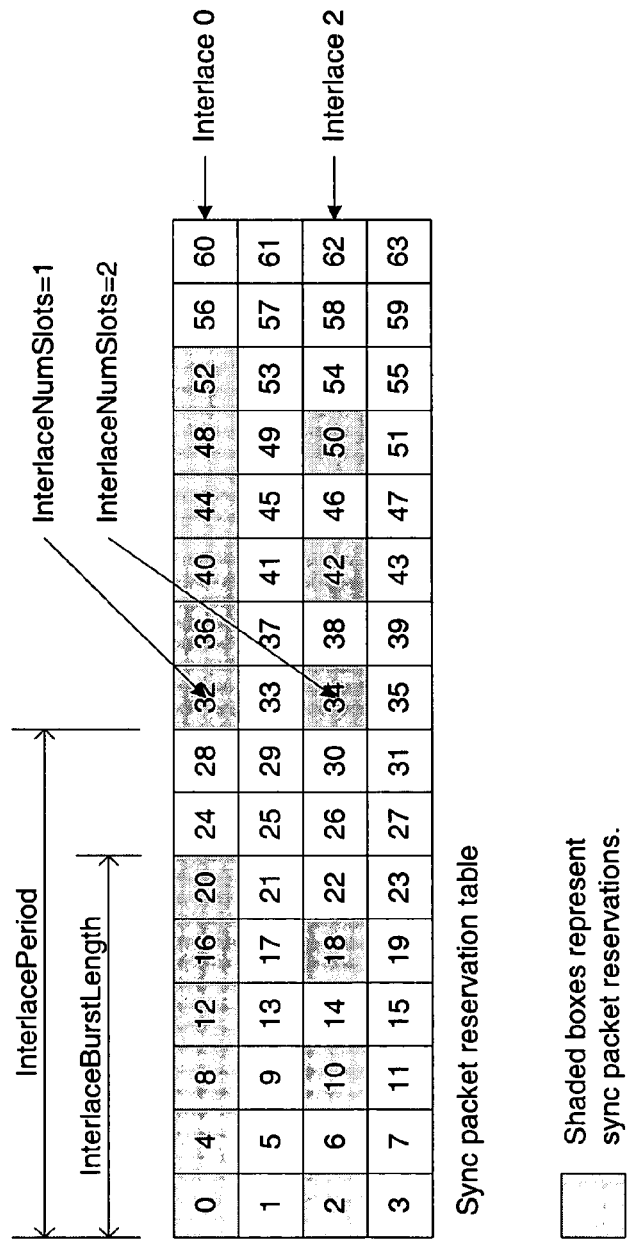
FIG. 9 is a table showing an example of a periodic synchronous packet reservation.

The sync packet manager maintains counters that track the period, burst length, and num slots for each periodic reservation. During the first "burst length" slots of the period, the sync packet manager writes the placeholders every "num slots." Two examples are shown in FIG. 9. The example shows two reservations flowing through the sync packet reservation table. Both periodic reservations have an interlace period of 8 slots and an interlace burst length of 6 slots. The periodic reservation on interlace 0 has InterlaceNumSlots set to 1, whereas the periodic reservation on interlace 2 has InterlaceNumSlots set to 2. Interlace 0 begins in the slot 0 (the current slot) and is a burst of 6 slots. Since the NumSlots is set to 1, the period for slot reservation is one, i.e., each consecutive slot. Interlace 2 begins in the slot 0 and is a burst of 1 slot. Since the NumSlots is set to 2, the period for slot reservation is two, i.e., after every other slot.

Two or more periodic reservations may overlap. If a reservation table entry already has a placeholder reservation, which is recorded in the scheduler, then the sync packet manager preserves the one with the highest priority.

Sync Packet Writes

Figure 10:
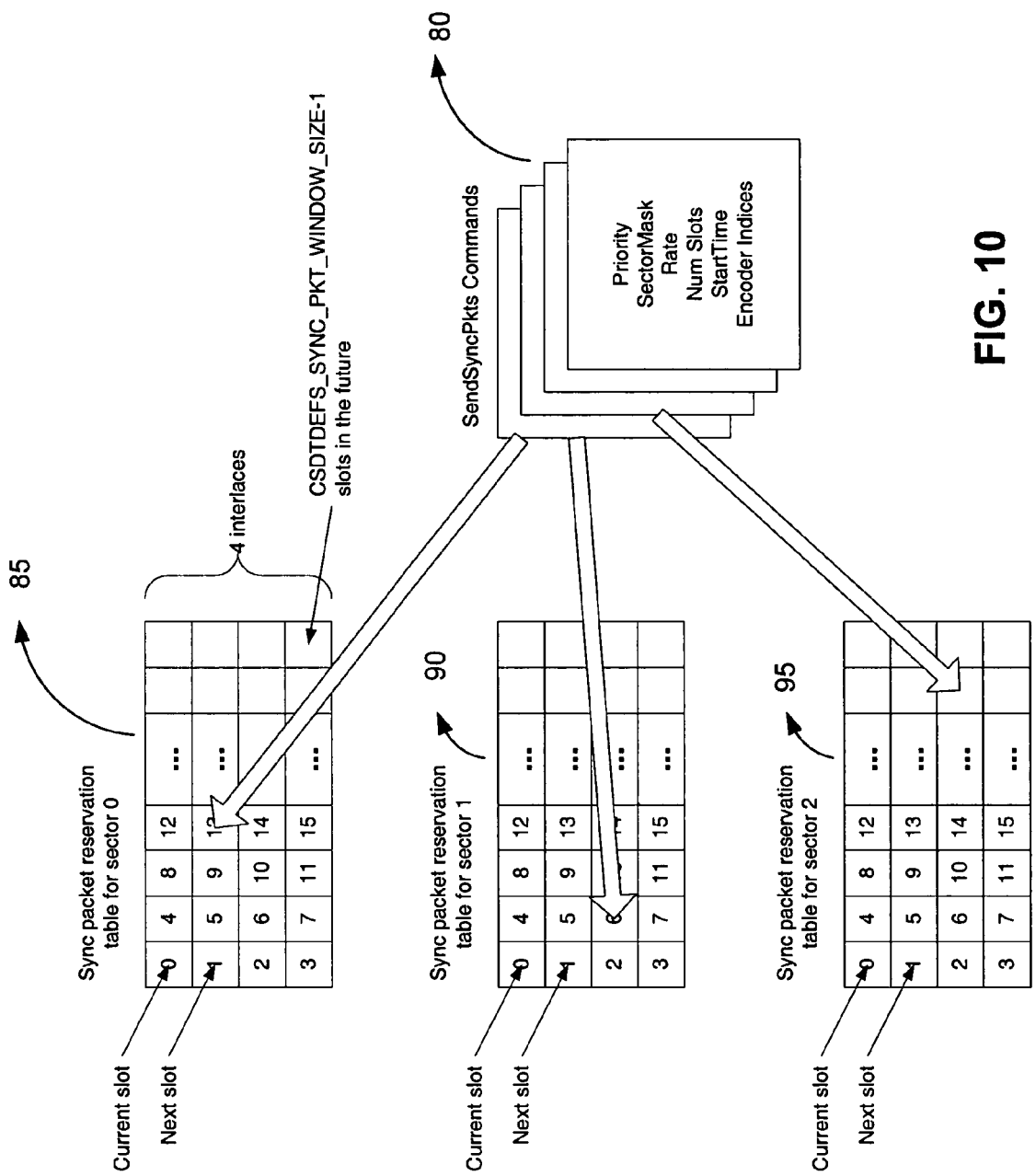
FIG. 10 is a diagram showing synchronous packet manager processing of a command.

This section describes how the sync packet manager processes the SendSyncPktsCmd. Each SendSyncPkts command contains one or more physical layer packets, which may be transmitted on one or more sectors (as specified by SectorMask). FIG. 10 shows the sync packet reservation tables for three sectors and several SendSynkPkts commands. A single command can be sent to multiple tables 85, 90, and 95.

When processing a SendSyncPktsCmd, the sync packet manager iterates over the packets in the command, and performs the following for each packet.

1. Validate the StartTime. The StartTime is to be within the current sync packet reservation table window of time. If StartTime is invalid, the sync packet manager issues a packet drop message for this packet for each sector present in SectorMask.
2. Find conflicting packets. At this stage, sync packet reservations only conflict if they have the same start time. In other words, as long as the sync packet manager can write the packet to the reservation table, it doesn't care if multi-slot packets will overlap. If a sync packet already occupies the reservation table entry, then the sync packet manager issues a packet drop message for the lower priority packet. If the packets have the same priority then the sync packet manager drops the older packet. If the reservation table entry contains a placeholder packet reservation, then the write will succeed only if the packet has a priority greater than or equal to the placeholder's priority.
3. Write the sync packet reservation(s). For each sector present in the command's SectorMask, and provided the packet was not dropped on this sector, write the packet information to the sector's reservation table entry that corresponds with the packet's start time.

Sync Packet Scheduling

Figure 11:
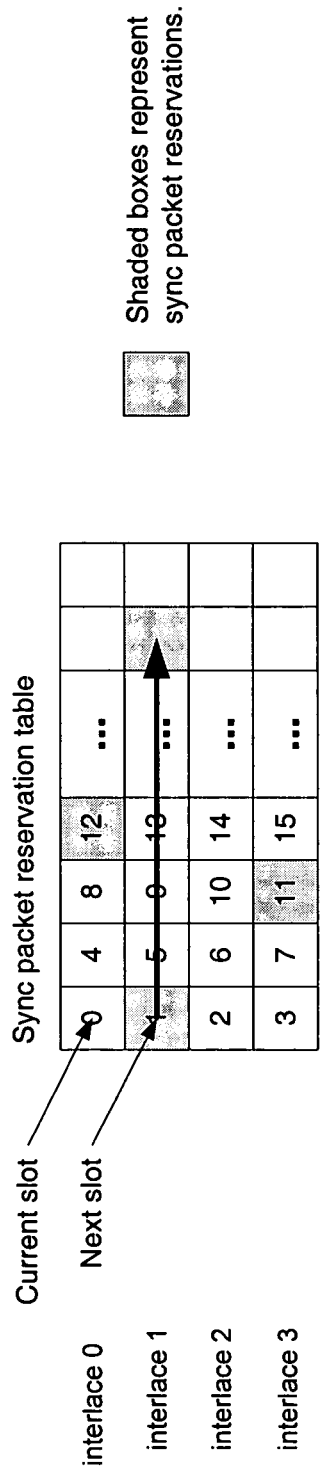
FIG. 11 is a table showing synchronous packet scheduling.

The sync packet manager must look at each reservation table of a sector to see if a sync packet is to be transmitted. As shown in FIG. 11, if the sync packet manager finds a packet reservation in the "next slot" entry of a reservation table in each sector, then it ensures that the sync packet can be transmitted without colliding with a packet that is already transmitting or colliding with a higher priority sync packet (or sync packet placeholder) in subsequent slots on the interlace. For example, on interlace 1, "next slot" 1 knows that it will not collide with another slot having higher priority until many slots later. Therefore, all the slots that are not reserved may be used for unicast/asynchronous packets.

More specifically, the sync packet manager performs the following two tests when finding a sync packet reservation in the "next slot" reservation table entry:

If there is already a packet transmitting on the "next slot" interlace, and this packet is due to repeat in the next slot, then the next-slot sync packet is dropped. There are two reasons why this may occur. Either the sync packet was written to the reservation table after a multi-slot unicast packet was already scheduled on the interlace (and the sync packet did not have a placeholder reservation), or an earlier higher priority multi-slot sync packet was given priority on the interlace.

If the "next slot" sync packet will require more than one slot to transmit, then the sync packet manager looks ahead NumSlots−1 (where NumSlots is the number of slots that the packet will require) on the interlace to make sure that the packet won't collide with any higher priority sync packet or sync packet placeholder reservation, as shown in FIG. 11.

If either test fails, then the sync packet manager issues a CSDTDEFS_SyncPktDroppedMsg for the "next slot" sync packet.

Interaction with the Unicast Scheduler

Figure 12:
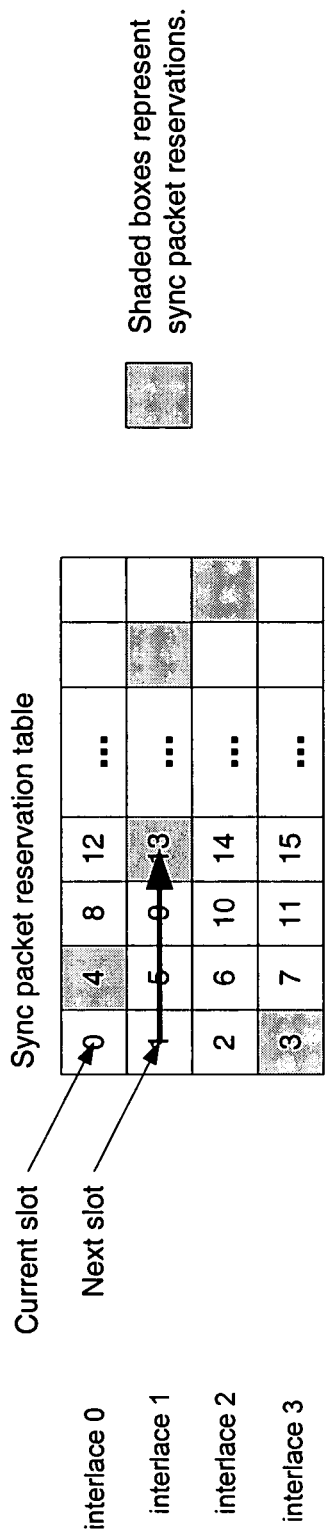
FIG. 12 is a table showing computation of the index SyncMaxNumSlots.

In one embodiment, the FL DSP gives priority to sync packets over unicast/asynchronous packets, so sync packet scheduling always occurs before unicast scheduling. However, if a "next slot" sync packet reservation table entry is free, then the slot is made available to the unicast scheduler. Furthermore, the sync packet manager looks ahead on the "next slot" interlace to see how many subsequent slots can be made available for unicast. This count is called SyncMaxNumSlots, which is provided to the unicast scheduler every slot for each sector. If SyncMaxNumSlots for a sector is zero then the next slot is not available for unicast data; otherwise, the unicast scheduler may schedule a packet that does not exceed SyncMaxNumSlots. FIG. 12 depicts the computation of SyncMaxNumSlots for a particular sector.

Physical layer packets do not exceed 16 slots, so the sync packet manager examines each reservation table entry on the interlace until encountering a sync packet reservation, as shown in FIG. 12, or SyncMaxNumSlots reaches 16.

Note, if the "next slot" reservation table entry contains a placeholder reservation, then SyncMaxNumSlots will normally be zero (i.e., not available for unicast data). The lack of an actual sync packet for the "next slot" will result in an idle slot transmission during the next slot. In many cases, this is desirable; however, the sync packet manager also supports a mode that allows unused "next slot" placeholder reservations to be released for unicast data. This mode may be useful for bursty logical synchronous channels (e.g., some types of broadcast channels), in which unicast data could be sent if the synchronous channel does not have data available. The synchronous packet manager supports this mode via a particular placeholder reservation priority level, as described below.

For the purpose of updating SyncMaxNumSlots, placeholder packet reservations with a "next slot" 1 have a slightly different behavior. A "next slot" 1 placeholder reservation in table entry 1 will be considered available for unicast. A priority 1 placeholder reservation in table entries greater than 1 (e.g., slots 5, 9, 13, etc. in FIG. 12) will be excluded from unicast data when updating SyncMaxNumSlots. In other words, a priority 1 placeholder in the next-slot position will be released for unicast, but a next-slot placeholder reservation with priority greater than 1 will force an idle slot transmission.

Note: SYNC_PKT_WINDOW_SIZE will be at least 16*4=64 slots since SyncMaxNumSlots ranges from 1 to 16.

Those of skill in the art would understand that various steps or elements in the embodiments may be altered or their order rearranged without varying from the invention that has been disclosed.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal such as the MS or reside at the BS. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for scheduling synchronous packet transmissions for transmission by a single transmission entity, comprising:
   a synchronous packet manager for scheduling synchronous packet transmissions for transmission by the single transmission entity on a wireless downlink channel; and
   a synchronous packet reservation table for storing slot reservations for the synchronous packet transmissions, wherein the stored slot reservations include at least one placeholder slot reservation for at least one slot on the wireless downlink channel that is unscheduled with any synchronous or asynchronous packet transmissions at the time of reservation, wherein the at least one placeholder slot reservation is configured to prohibit scheduling of any asynchronous packet for transmission by the single transmission entity on the wireless downlink channel in the at least one slot for at least a threshold period of time while the at least one slot remains unscheduled with any synchronous or asynchronous packet transmissions,
   wherein the stored slot reservations for the synchronous packet transmissions are established irrespective of when synchronous packets to be transmitted are expected to arrive at the single transmission entity for transmission.

2. The apparatus in claim 1, wherein the synchronous packet manager further comprises a packet scheduler for scheduling asynchronous packet transmissions in response to the synchronous packet reservation table.

3. The apparatus in claim 1, wherein the synchronous packet reservation table is further for storing status information, wherein the status information comprises:
   a priority of a synchronous packet reservation; and
   a number of slots over which the packet is transmitted.

4. The apparatus in claim 1, wherein the synchronous packet manager determines a reservation to be written in the synchronous packet reservation table.

5. The apparatus in claim 1, wherein the synchronous packet manager maintains a record of a period, burst length, and num_slots for each of said reservation.

6. The apparatus in claim 2, wherein the synchronous packet manager is further configured to:
   validate a start time;
   find conflicting packets; and
   write a synchronous packet reservation in the synchronous packet reservation table.

7. The apparatus in claim 2, wherein the asynchronous packet transmissions are traffic data.

8. The apparatus in claim 4, wherein the reservation comprises:
   a priority for a placeholder entry;
   a Start_Time that identifies a first slot to be reserved;
   an Interlace Period that indicates a period of the reservation;
   an Interlace_Burst_Length that indicates a duty cycle of the reservation; and
   an Interlace_Num_Slots index that indicates a period at which the reservation is written.

9. The apparatus in claim 4, wherein the reservation is sent to multiple synchronous packet reservation tables.

10. A method for scheduling synchronous packet transmissions for transmission by a single transmission entity, comprising:
   scheduling synchronous packet transmissions for transmission by the single transmission entity on a wireless downlink channel; and
   storing slot reservations for the synchronous packet transmissions, wherein the stored slot reservations include at least one placeholder slot reservation for at least one slot on the wireless downlink channel that is unscheduled with any synchronous or asynchronous packet transmissions at the time of reservation, wherein the at least one placeholder slot reservation is configured to prohibit scheduling of any asynchronous packet for transmission by the single transmission entity on the wireless downlink channel in the at least one slot for at least a threshold period of time while the at least one slot remains unscheduled with any synchronous or asynchronous packet transmissions,
   wherein the stored slot reservations for the synchronous packet transmissions are established irrespective of when synchronous packets to be transmitted are expected to arrive at the single transmission entity for transmission.

11. The method in claim 10, wherein scheduling synchronous packet transmissions further comprises scheduling asynchronous packet transmissions in response to a synchronous packet reservation table.

12. The method in claim 10, wherein scheduling synchronous packet transmissions further comprises writing a reservation in the synchronous packet reservation table.

13. The method in claim 10, wherein scheduling synchronous packet transmissions further comprises maintaining a record of a period, burst length, and num_slots for each of said reservation.

14. The method in claim 11, wherein the asynchronous packet transmissions are traffic data.

15. The method in claim 12, wherein writing the reservation further comprises:
   validating a start time;
   finding conflicting packets; and
   writing a synchronous packet reservation in the synchronous packet reservation table.

16. The method in claim 12, wherein writing the reservation is performed on multiple synchronous packet reservation tables.

17. An apparatus for scheduling synchronous packet transmissions for transmission by a single transmission entity, comprising:
   means for scheduling synchronous packet transmissions for transmission by the single transmission entity on a wireless downlink channel; and
   means for storing slot reservations for the synchronous packet transmissions, wherein the stored slot reservations include at least one placeholder slot reservation for at least one slot on the wireless downlink channel that is unscheduled with any synchronous or asynchronous packet transmissions at the time of reservation, wherein the at least one placeholder slot reservation is configured to prohibit scheduling of any asynchronous packet for transmission by the single transmission entity on the wireless downlink channel in the at least one slot for at least a threshold period of time while the at least one slot remains unscheduled with any synchronous or asynchronous packet transmissions,
   wherein the stored slot reservations for the synchronous packet transmissions are established irrespective of when synchronous packets to be transmitted are expected to arrive at the single transmission entity for transmission.

18. The apparatus in claim 17, wherein the means for scheduling synchronous packet transmissions further comprises a packet scheduler for scheduling asynchronous packet transmissions in response to a synchronous packet reservation table.

19. The apparatus in claim 17, wherein the status information comprises:
   a priority of a synchronous packet reservation; and
   a number of slots corresponding to a period of slots for the synchronous packet reservation over which the packet is transmitted.

20. The apparatus in claim 17, wherein the means for scheduling maintains a record of a period, burst length, and num_slots for each of said reservation.

21. The apparatus in claim 17, wherein the means for scheduling further determines a reservation to be written in the synchronous packet reservation table.

22. The apparatus in claim 17, wherein the means for scheduling synchronous packet transmissions is further configured to:
   validate a start time;
   find conflicting packets; and
   write a synchronous packet reservation in the synchronous packet reservation table.

23. The apparatus in claim 20, wherein the reservation comprises:
   a priority for a placeholder entry;
      a Start_Time that identifies a first slot to be reserved;
      an Interlace_Period that indicates a period of the reservation;
      an Interlace_Burst_Length that indicates a duty cycle of the reservation; and
      an Interlace_Num_Slots index that indicates a period at which the reservation is written.

24. The apparatus in claim 20, wherein the reservation is sent to multiple synchronous packet reservation tables.

25. An apparatus for scheduling synchronous packet transmissions for transmission by a single transmission entity, comprising:
   a memory storage unit which stores instructions; and
   a processor coupled to the memory storage unit, wherein the instructions configure the processor to:
   schedule synchronous packet transmissions for transmission by the single transmission entity on a wireless downlink channel; and
   store slot reservations for the synchronous packet transmissions, wherein the stored slot reservations include at least one placeholder slot reservation for at least one slot on the wireless downlink channel that is unscheduled with any synchronous or asynchronous packet transmissions at the time of reservation, wherein the at least one placeholder slot reservation is configured to prohibit scheduling of any asynchronous packet for transmission by the single transmission entity on the wireless downlink channel in the at least one slot for at least a threshold period of time while the at least one slot remains unscheduled with any synchronous or asynchronous packet transmissions,
   wherein the stored slot reservations for the synchronous packet transmissions are established irrespective of when synchronous packets to be transmitted are expected to arrive at the single transmission entity for transmission.

26. A non-transitory computer readable storage medium which stores executable instructions, wherein the executable instructions cause a processor to:
schedule synchronous packet transmissions for transmission by a single transmission entity on a wireless downlink channel; and
store slot reservations for the synchronous packet transmissions, wherein the stored slot reservations include at least one placeholder slot reservation for at least one slot on the wireless downlink channel that is unscheduled with any synchronous or asynchronous packet transmissions at the time of reservation, wherein the at least one placeholder slot reservation is configured to prohibit scheduling of any asynchronous packet for transmission by the single transmission entity on the wireless downlink channel in the at least one slot for at least a threshold period of time while the at least one slot remains unscheduled with any synchronous or asynchronous packet transmissions,
wherein the stored slot reservations for the synchronous packet transmissions are established irrespective of when synchronous packets to be transmitted are expected to arrive at the single transmission entity for transmission.

27. The apparatus of claim 1, wherein the stored slot reservations correspond to slot positions where asynchronous packet transmissions cannot be scheduled irrespective of whether synchronous packet transmissions are scheduled at the slot positions.

28. The apparatus of claim 27, wherein each of the stored slot reservations repeats at a given period at the same respective slot position.

29. The apparatus of claim 27, further comprising:
a packet scheduler for scheduling asynchronous packet transmissions in response to the synchronous packet reservation table such that one or more asynchronous packet transmissions are interlaced between the slot positions of the stored slot reservations.

30. The apparatus of claim 2, wherein the synchronous packet reservation table stores the slot reservations for the synchronous packet transmissions before the synchronous packet manager schedules the synchronous packet transmissions.

31. The apparatus of claim 2, wherein, before each of the slot positions corresponding to the stored slot reservations are scheduled with synchronous packet transmissions, one or more of the asynchronous packet transmissions are scheduled in response to the synchronous packet reservation table.

32. The apparatus of claim 1, wherein, in the event that the synchronous packet manager does not schedule any synchronous packet transmissions within a particular slot corresponding to one of the stored slot reservations, the packet scheduler is permitted to schedule a given asynchronous packet transmission in the particular slot.

33. The apparatus of claim 1, wherein the synchronous packet manager schedules synchronous packets for transmission within one or more of the slot reservations only after the synchronous packets became available for transmission.

34. A method for scheduling synchronous packet transmissions for transmission by a single transmission entity, comprising:
scheduling synchronous packet transmissions for transmission by the single transmission entity; and
storing slot reservations for the synchronous packet transmissions, wherein the stored slot reservations are for at least one slot where any asynchronous packet for transmission by the single transmission entity in the at least one slot is prohibited for at least a threshold period of time irrespective of whether or not the at least one slot is scheduled with any synchronous or asynchronous packet transmissions,
wherein the stored slot reservations for the synchronous packet transmissions correspond to less than all available slots,
and wherein the stored slot reservations for the synchronous packet transmissions are established irrespective of when synchronous packets to be transmitted are expected to arrive at the single transmission entity for transmission.

35. The method of claim 34, further comprising:
receiving one or more asynchronous packets to be scheduled for transmission; and
scheduling the one or more asynchronous packets within one or more unreserved slots that do not conflict with the stored slot reservations.

36. The method of claim 10, wherein the at least one placeholder slot reservation is further configured to permit scheduling of a synchronous packet for transmission by the single transmission entity on the wireless downlink channel in the at least one slot while the at least one slot remains unscheduled with any synchronous or asynchronous packet transmissions.

37. The method of claim 10,
wherein the threshold period of time extends until N number of slots before the at least one slot, further comprising:
determining that the at least one slot remains unscheduled with any synchronous or asynchronous packet transmissions when the threshold period of time is over;
removing the at least one placeholder slot reservation in response to the determination; and
permitting one or more asynchronous packets to be scheduled for transmission by the single transmission entity on the wireless downlink channel in the at least one slot in response to the removal of the at least one placeholder slot reservation.

38. The method of claim 37, wherein N=1.

39. The method of claim 10, wherein the threshold period of time extends until the at least one slot such that the at least one placeholder slot reservation is not removed and no asynchronous packets are permitted to be scheduled in the at least one slot even in the event that the at least one slot remains unscheduled with any synchronous or asynchronous packet transmissions when the at least one slot is reached.

40. The method of claim 10,
wherein the synchronous packet transmissions correspond to periodically transmitted multicast traffic, and
wherein the stored slot reservations prohibit asynchronous unicast traffic from being scheduled in any reserved slot corresponding to the stored slot reservations for at least the threshold period of time.

* * * * *